(12) United States Patent
Goto et al.

(10) Patent No.: US 9,889,555 B2
(45) Date of Patent: Feb. 13, 2018

(54) ROBOT SYSTEM

(71) Applicant: Seiko Epson Corporation, Tokyo (JP)

(72) Inventors: Yoshinobu Goto, Azumino (JP);
Masaru Takahashi, Matsumoto (JP);
Sota Yamamoto, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/363,577

(22) Filed: Nov. 29, 2016

(65) Prior Publication Data

US 2017/0151665 A1 Jun. 1, 2017

(30) Foreign Application Priority Data

Dec. 1, 2015 (JP) .................................. 2015-235083

(51) Int. Cl.
| | |
|---|---|
| *B25J 9/00* | (2006.01) |
| *B25J 15/08* | (2006.01) |
| *B23Q 1/64* | (2006.01) |
| *B23Q 16/02* | (2006.01) |

(52) U.S. Cl.
CPC .............. *B25J 9/0096* (2013.01); *B23Q 1/64* (2013.01); *B23Q 16/026* (2013.01); *B25J 15/08* (2013.01)

(58) Field of Classification Search
CPC ......... B25J 3/00; B25J 3/02; B25J 3/04; B25J 9/104; B25J 9/1045; B25J 9/0096; B25J 15/08; B25J 15/0095; B23Q 1/64; B23Q 1/66; B23Q 16/026; B65G 69/26

USPC .................................. 294/213; 414/2, 7, 930
See application file for complete search history.

(56) References Cited

U.S. PATENT DOCUMENTS

| | | | | |
|---|---|---|---|---|
| 4,283,165 A | * | 8/1981 | Vertut | B25J 5/007 280/771 |
| 4,831,547 A | * | 5/1989 | Ishiguro | B25J 9/0096 318/568.19 |
| 2007/0224023 A1 | * | 9/2007 | Cho | B25J 9/0096 414/467 |
| 2014/0179501 A1 | | 6/2014 | Akama et al. | |

FOREIGN PATENT DOCUMENTS

| | | |
|---|---|---|
| JP | 11-070917 A | 3/1999 |
| JP | 2005-001304 A | 1/2005 |
| JP | 2014-124798 A | 7/2014 |
| JP | 5943401 B1 | 7/2016 |

* cited by examiner

*Primary Examiner* — Dean J Kramer
(74) *Attorney, Agent, or Firm* — Harness, Dickey & Pierce, P.L.C.

(57) ABSTRACT

A robot system includes a robot including a hand including a plurality of finger sections and a work device in which the robot performs work. The work device includes a first rotating body, a second rotating body configured to rotate in association with rotation of the first rotating body, a grip section provided in the first rotating body, and a setting section provided in the second rotating body, a target object of the work performed by the robot being set on the setting section. The robot grips the grip section with the finger sections to rotate the first rotating body.

8 Claims, 8 Drawing Sheets

ROBOT SYSTEM

BACKGROUND

1. Technical Field

The present invention relates to a robot system and a robot.

2. Related Art

There has been proposed a robot system including a robot that includes a hand and performs predetermined work such as assembly and machining (e.g., JP-A-2014-124798 (Patent Literature 1).

In the robot system, in order to improve efficiency of work by the robot, it is conceivable to rotate, with a motor, a workbench on which a target object of the work performed by the robot is set. However, in this case, a control device that drives the motor is necessary separately from the robot. Therefore, manufacturing cost of the robot system increases. When the workbench is directly rotated, the rotation cannot be highly accurately performed. Further, it is necessary to drive the motor, which rotates the workbench, and the robot in synchronization with each other. Therefore, control is complicated.

SUMMARY

An advantage of some aspects of the invention is to provide a robot system that can highly accurately rotate a setting section on which a target object of work performed by a robot is set and can suppress an increase in manufacturing cost and complication of control. Another advantage of some aspects of the invention is to provide such a robot.

A robot system according to an aspect of the invention includes: a robot including a hand including a plurality of finger sections; and a work device in which the robot performs work. The work device includes: a first rotating body; a second rotating body configured to rotate in association with rotation of the first rotating body; a grip section provided in the first rotating body; and a setting section provided in the second rotating body, a target object of the work performed by the robot being set on the setting section. The robot grips the grip section with the finger sections to rotate the first rotating body.

According to the robot system according to the aspect of the invention, the robot can rotate the second rotating body, in which the setting section is provided, by gripping the grip section with the hand and rotating the first rotating body. Therefore, it is unnecessary to provide a motor that rotates the setting section and a control system that controls the motor. Consequently, it is possible to suppress manufacturing cost of the robot system from increasing. It is unnecessary to separately synchronize control for rotating the setting section and control of the robot. It is possible to suppress control of the robot system from being complicated. It is possible to highly accurately rotate the first rotating body by using the hand of the robot capable of highly accurately rotating. Therefore, it is possible to obtain the robot system that can highly accurately rotate the setting section on which the target object of the work performed by the robot is set and can suppress the increase in the manufacturing cost and the complication of the control.

The work device may include an annular driving member wound on the first rotating body and the second rotating body, and the rotation of the first rotating body may be transmitted to the second rotating body via the driving member.

According to this configuration, it is possible to dispose the first rotating body and the second rotating body apart from each other. Therefore, it is easy to perform each of operation for gripping the grip section and operation for performing work on the target object set on the setting section. It is possible to simplify a mechanism for transmitting the rotation of the first rotating body to the second rotating body.

The work device may further include: a first supporting table configured to rotatably support the first rotating body; a second supporting table configured to rotatably support the second rotating body and coupled to the first supporting table; and an adjusting mechanism capable of adjusting a distance between the first supporting table and the second supporting table.

According to this configuration, when the driving member wound on the first rotating body and the second rotating body is a belt, it is possible to adjust tension applied to the belt.

A diameter of the first rotating body may be smaller than a diameter of the second rotating body.

According to this configuration, it is possible to improve rotation accuracy of the second rotating body.

The hand may further include: a base configured to support the plurality of finger sections; and a palm section attached to the base and located between the finger sections, and the palm section may come into contact with the grip section when the robot grips the grip section with the finger sections.

According to this configuration, it is possible to stably grip the grip section.

The base may be capable of rotating around a predetermined axis, the plurality of finger sections may be provided around the predetermined axis along a circumferential direction, and the palm section may be capable of moving along a direction in which the predetermined axis extends.

According to this configuration, it is possible to more stably grip the grip section.

The grip section may have a rectangular parallelepiped shape.

According to this configuration, it is easy to grip the grip section.

The first rotating body may be made of resin.

According to this configuration, it is easy to reduce the weight of the first rotating body. It is possible to reduce an output of a hand that rotates the first rotating body. Consequently, it is possible to suppress the hand from being increased in size.

A robot according to another aspect of the invention includes a hand including a plurality of finger sections, the robot performing work in a work device. The work device includes: a first rotating body; a second rotating body configured to rotate in association with rotation of the first rotating body; a grip section provided in the first rotating body; and a setting section provided in the second rotating body, a target object of the work performed by the robot being set on the setting section. The robot grips the grip section with the finger sections to rotate the first rotating body in the work device.

According to the robot according to the aspect of the invention, it is possible to highly accurately rotate the setting section on which the target object of the work is set. It is possible to suppress an increase in manufacturing cost and complication of control of a robot system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
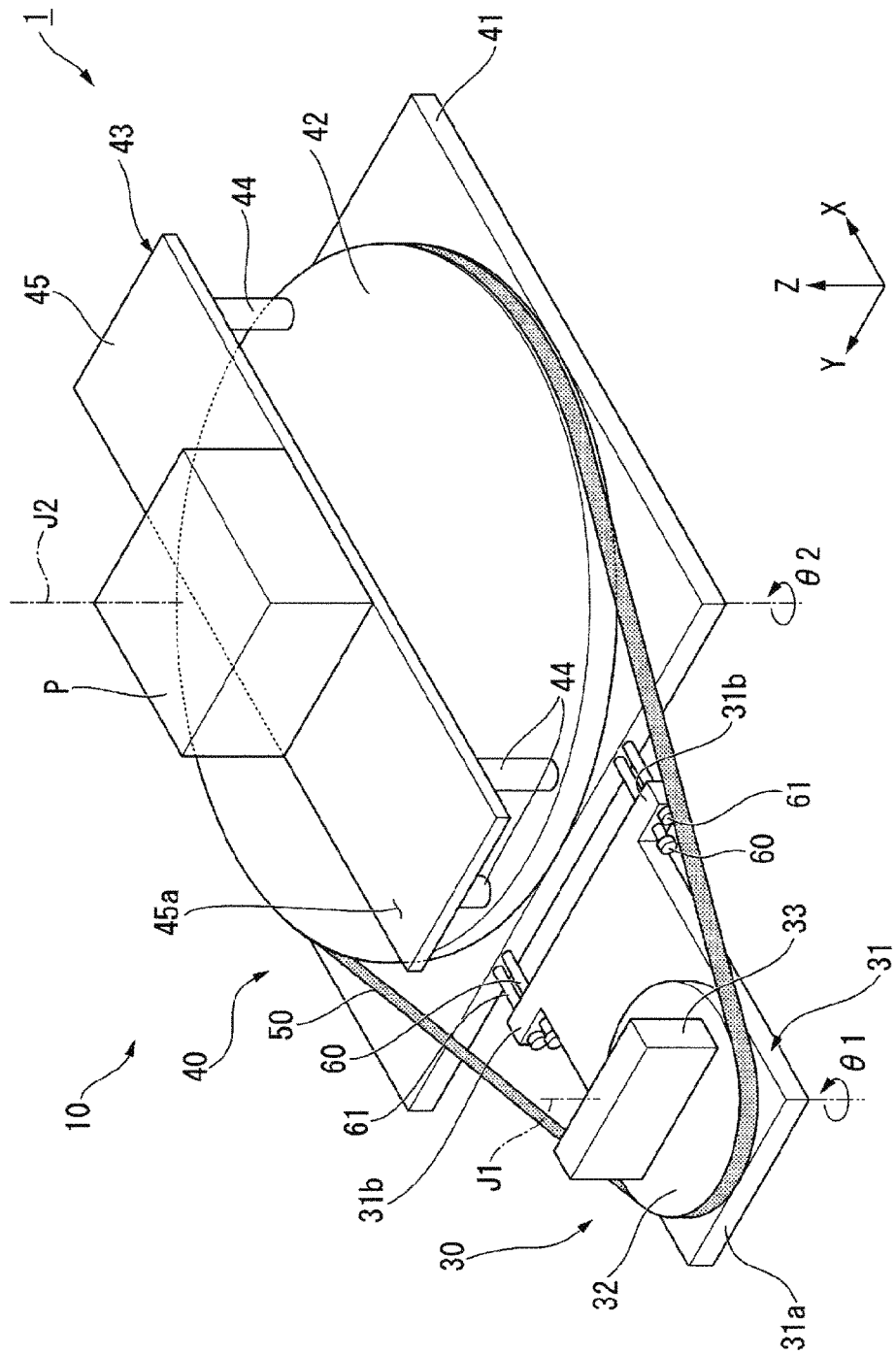
FIG. 1 is a perspective view showing a work device in an embodiment.

A robot system according to an embodiment of the invention is explained with reference to the drawings. Note that the scope of the invention is not limited to the embodiment and can be optionally changed within the scope of the technical idea of the invention. In the drawings referred to below, in order to clearly show components, scales, numbers, and the like in structures are sometimes differentiated from scales, numbers, and the like in actual structures.

In the drawings, an XYZ coordinate system is shown as a three-dimensional orthogonal coordinate system as appropriate. In the XYZ coordinate system, a Z-axis direction is the vertical direction. An X-axis direction is a direction orthogonal to the Z-axis direction and is a direction in which an operation section 30 and a work section 40 shown in FIG. 1 are arranged side by side. A Y-axis direction is a direction orthogonal to the Z-axis direction and the X-axis direction. In the following explanation, unless particularly noted otherwise, the direction (the X-axis direction) in which the operation section 30 and the work section 40 are arranged side by side is sometimes referred to as left-right direction and the direction (the Y-axis direction) orthogonal to the direction in which the operation section 30 and the work section 40 are arranged side by side and the vertical direction is sometimes referred to as front-rear direction.

Figure 2:
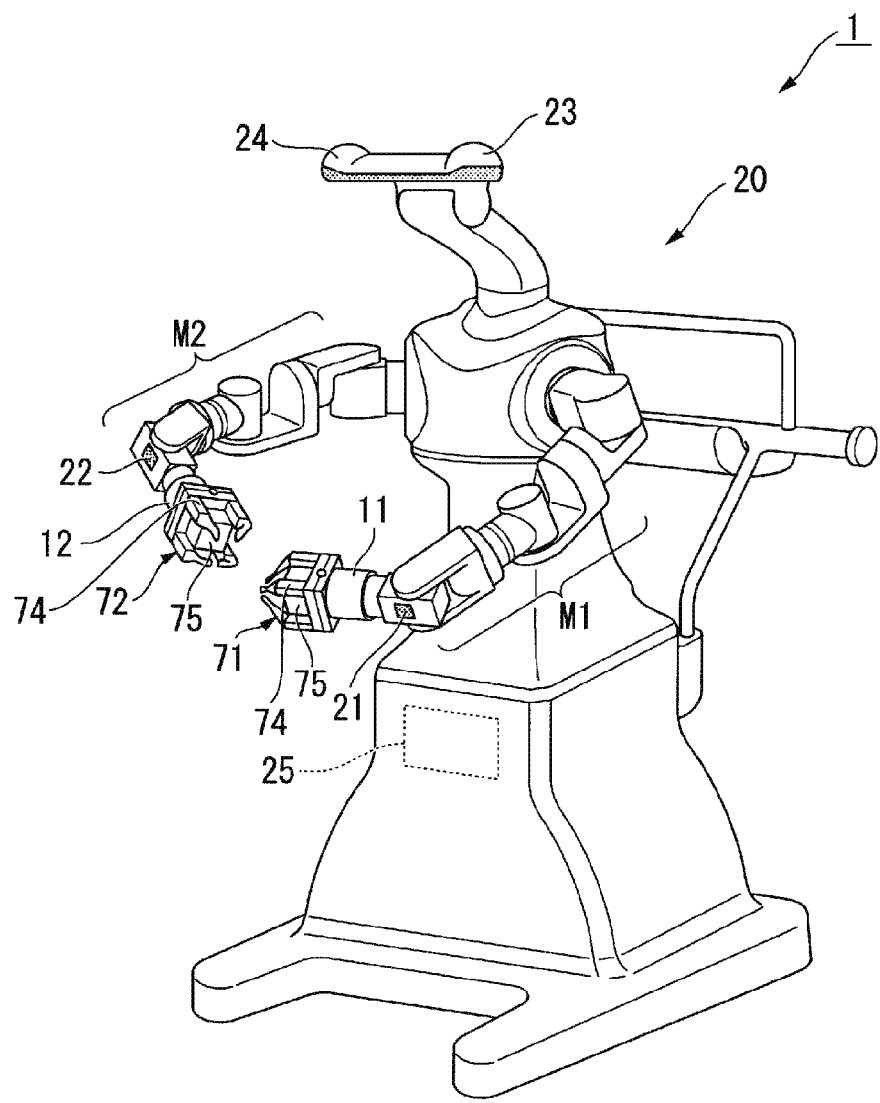
FIG. 2 is a perspective view showing a robot in the embodiment.
Figure 3:
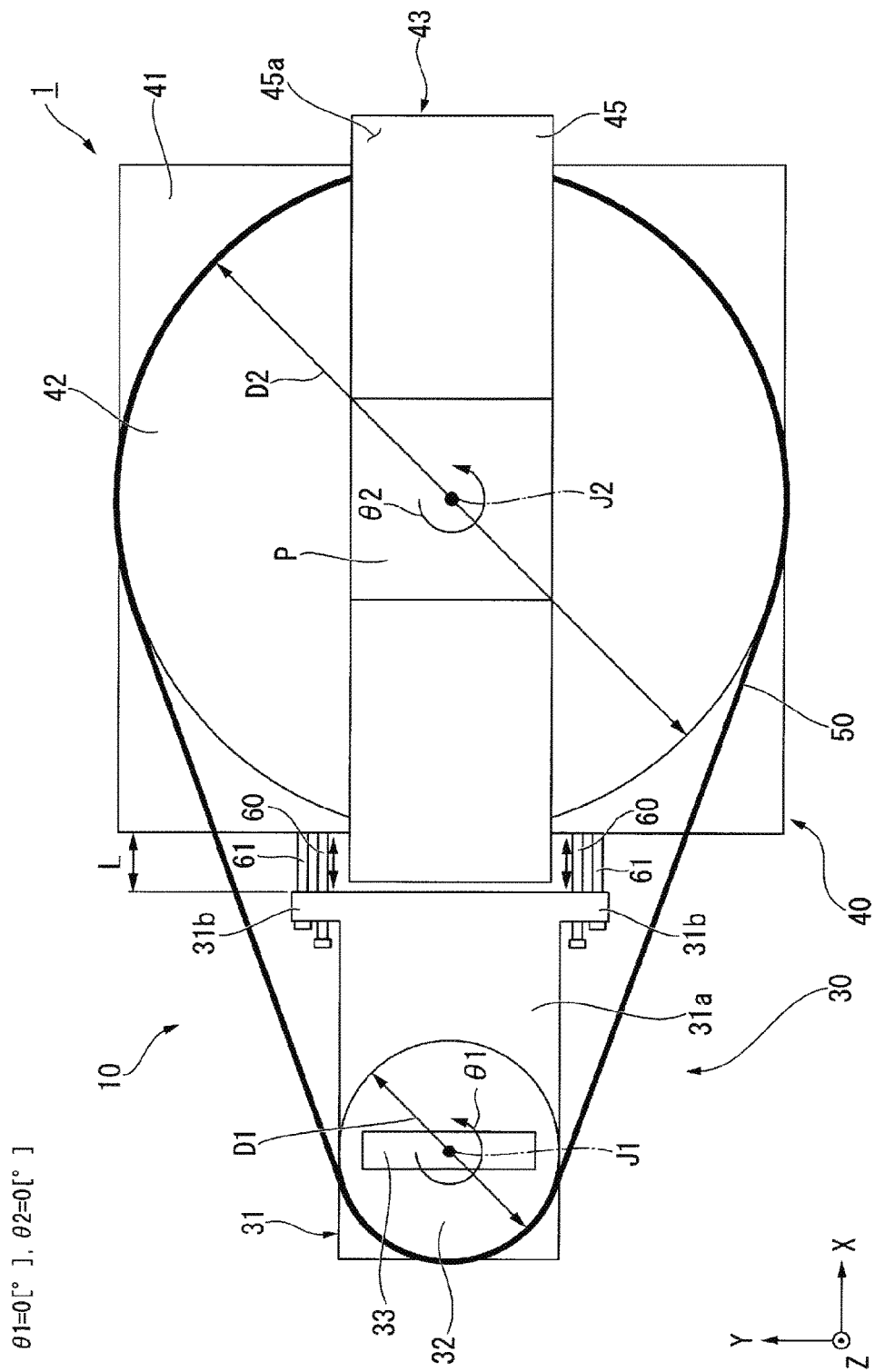
FIG. 3 is a plan view showing the work device in the embodiment.
Figure 4:
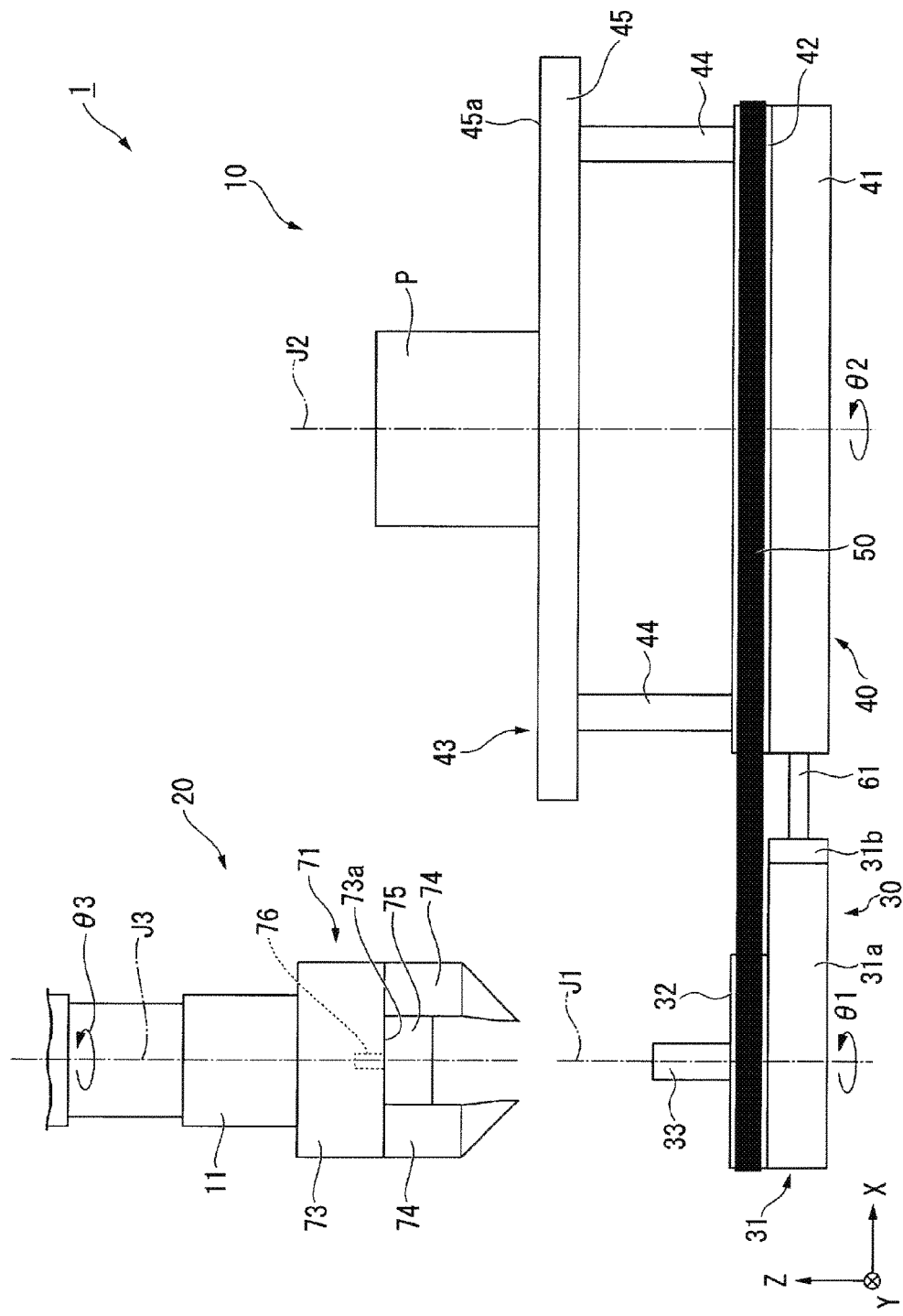
FIG. 4 is a front view showing a portion of a robot system in the embodiment.
Figure 5:
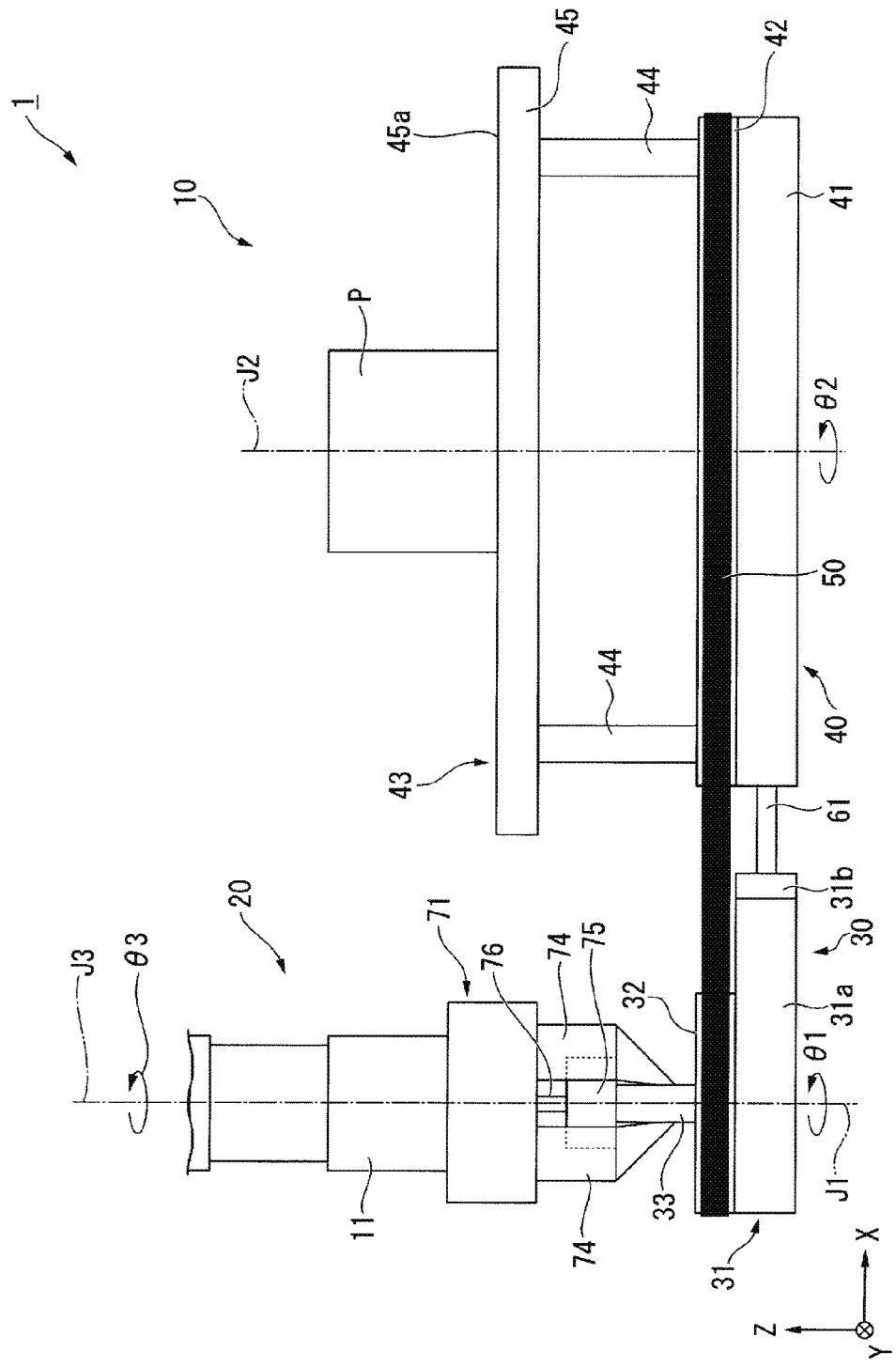
FIG. 5 is a front view showing the portion of the robot system in the embodiment.

FIGS. 1 and 2 are perspective views showing a portion of a robot system 1 in this embodiment. FIG. 1 shows a work device 10 in this embodiment. FIG. 2 shows a robot 20 in this embodiment. FIG. 3 is a plan view showing the work device 10. FIGS. 4 and 5 are front views showing the portion of the robot system 1.

In the robot system 1 in this embodiment, the robot 20 shown in FIG. 2 performs work in the work device 10 shown in FIG. 1. The work performed by the robot 20 is, for example, assembly work of a box. A target object P of the work performed by the robot 20 is, for example, the box before being assembled.

As shown in FIGS. 1 and 3, the work device 10 includes the operation section 30, the work section 40, a belt (a driving member) 50, adjusting mechanisms 60, and auxiliary fixing members 61. The operation section 30 is a portion operated by the robot 20. The operation section 30 is a first supporting table 31, a first pulley (a first rotating body) 32, and a grip section 33.

The first supporting table 31 rotatably supports the first pulley 32. The first supporting table 31 includes a supporting table main body 31a and fixing sections 31b. A plan view shape of the supporting table main body 31a is, for example, a rectangular shape long in the left-right direction (the X-axis direction). The fixing sections 31b extend to both sides in the front-rear direction (the Y-axis direction) from the end portion on the work section 40 side (a +X side) of the supporting table main body 31a.

The first pulley 32 is set on the upper surface of the supporting table main body 31a. The first pulley 32 has a disk shape expanding in a direction orthogonal to the vertical direction. The first pulley 32 is supported by the supporting table main body 31a to be capable of rotating around a first rotation axis J1 (a ±θ1 direction) parallel to the vertical direction. The first rotation axis J1 passes the center of the first pulley 32. A diameter D1 of the first pulley 32 is smaller than a diameter D2 of a second pulley 42. The diameter D1 of the first pulley 32 is substantially the same as a dimension in the front-rear direction (the Y-axis direction) of the supporting table main body 31a. The first pulley 32 is made of, for example, resin.

The grip section 33 is provided in the first pulley 32. The grip section 33 is fixed to the upper surface of the first pulley 32. The grip section 33 has a rectangular parallelepiped shape. The grip section 33 extends in the direction orthogonal to the vertical direction. The length of the grip section 33 is smaller than the diameter D1 of the first pulley 32. The grip section 33 rotates around the first rotation axis J1 (the ±θ1 direction) integrally with the first pulley 32.

The work section 40 is a portion where work by the robot 20 is performed. The work section 40 includes a second supporting table 41, the second pulley (a second rotating body) 42, and a workbench (a setting section) 43. The second supporting table 41 rotatably supports the second pulley 42. A plan view shape of the second supporting table 41 is, for example, a square shape. The second supporting table 41 is coupled to the first supporting table 31. More specifically, the second supporting table 41 is coupled to the first supporting table 31 by the adjusting mechanisms 60 and the auxiliary fixing members 61.

The second pulley 42 is set on the upper surface of the second supporting table 41. The second pulley 42 has a disk shape expanding in the direction orthogonal to the vertical direction. The second pulley 42 is supported by the second supporting table 41 to be capable of rotating around a second rotation axis J2 (a ±θ2 direction) parallel to the vertical direction. The second rotation axis J2 passes the center of the second pulley 42. A diameter D2 of the second pulley 42 is larger than the diameter D1 of the first pulley 32. The diameter D2 of the second pulley 42 is substantially the same as a dimension in the front-rear direction (the Y-axis direction) and a dimension in the left-right direction (the X-axis direction) of the second supporting table 41. In this embodiment, a ratio of the diameter D1 of the first pulley 32 and the diameter D2 of the second pulley 42 is, for example, 1:3. The second pulley 42 is made of, for example, resin.

The target object P of the work performed by the robot 20 is set on the workbench 43. The workbench 43 is provided in the second pulley 42. The workbench 43 rotates around the second rotation axis J2 (the ±θ2 direction) integrally with the second pulley 42.

The workbench 43 includes a workbench main body 45 and leg sections 44. The workbench main body 45 has a tabular shape expanding in the direction orthogonal to the vertical direction. A plan view shape of the workbench main body 45 is a rectangular shape. The target object P is set on an upper surface 45a of the workbench main body 45. As shown in FIG. 1, the leg sections 44 extend from the lower surface of the workbench main body 45 to a vertical direction lower side. The lower ends of the leg sections 44 are fixed to the upper surface of the second pulley 42. The leg sections 44 are provided one by one near the four corners on the lower surface of the workbench main body 45. The leg sections 44 have, for example, a columnar shape.

The belt 50 is annular. The belt 50 is wound on the first pulley 32 and the second pulley 42. Tension is applied to the belt 50. According to rotation of the first pulley 32, the belt 50 moves along a direction in which the belt 50 extends. The rotation of the first pulley 32 is transmitted to the second pulley 42 via the belt 50. That is, when the first pulley 32 rotates and the belt 50 moves, the second pulley 42 rotates according to the movement of the belt 50. Consequently, the second pulley 42 rotates in association with the rotation of the first pulley 32.

As shown in FIG. 3, the adjusting mechanisms 60 are capable of adjusting a distance L between the first supporting table 31 and the second supporting table 41. In this embodiment, the adjusting mechanisms 60 are for example, screws extending in the left-right direction (the X-axis direction). The adjusting mechanisms 60 are inserted through through-holes that pierce through the fixing sections 31*b* of the first supporting table 31 in the left-right direction. Threads are cut on the inner sides of the through-holes provided in the fixing sections 31*b*. The adjusting mechanisms 60 are screwed in the through-holes of the fixing sections 31*b*. The end portions on the second supporting table 41 side (the +X side) of the adjusting mechanisms 60 are attached to the second supporting table 41 to be capable of rotating around the left-right direction. The adjusting mechanisms 60 are respectively provided in the two fixing sections 31*b*. By rotating the adjusting mechanisms 60, it is possible to move the fixing sections 31*b* in the left-right direction. Consequently, it is possible to adjust the distance L.

The auxiliary fixing members 61 couple the first supporting table 31 and the second supporting table 41. The auxiliary fixing members 61 pierce through the fixing sections 31*b* of the first supporting table 31 in the left-right direction. The fixing sections 31*b* are capable of moving in the left-right direction (the X-axis direction) with respect to the auxiliary fixing members 61. The end portions on the second supporting table 41 side (the +X side) of the auxiliary fixing members 61 are fixed to the second supporting table 41. The auxiliary fixing members 61 are provided further on the opposite side of the supporting table main body 31*a* in the front-rear direction (the Y-axis direction) than the adjusting mechanisms 60. Since the auxiliary fixing members 61 are provide, it is possible to stable couple the first supporting table 31 and the second supporting table 41.

As shown in FIG. 2, the robot 20 is a double-arm robot including a first arm, a second arm, a supporting table that supports the first arm and the second arm, and a robot control device 25. The double-arm robot is a robot including two arms such as the first arm and the second arm in an example shown in FIG. 2. Note that the robot 20 may be a single-arm robot instead of the double-arm robot. The single-arm robot is a robot including one arm. For example, the single-arm robot includes one of the first arm and the second arm. The robot 20 may be a plural-arm robot including three or more arms instead of the double-arm robot.

The first arm includes a first hand (a hand) 71, a first manipulator M1, and a first force detecting section 11. Note that, in this embodiment, the first hand 71 is included in the first arm. However the first arm and the first hand 71 may be separate. In this case, the first arm includes the first manipulator M1 and the first force detecting section 11.

The first hand 71 is a part equivalent to the tip of the first arm. As shown in FIG. 4, the first hand 71 includes a base 73, a plurality of finger sections 74, a palm section 75, and a shaft section 76. The base 73 supports the plurality of finger sections 74. The base 73 has, for example, a square pole shape. In this embodiment, a motor is provided in the base 73. Consequently, the base 73 is capable of rotating around a third rotation axis (a predetermined axis) J3 (a ±θ3 direction). A high-accuracy encoder is provided in a rotating shaft of the motor. It is possible to highly accurately rotate the base 73. The third rotation axis J3 is orthogonal to a supporting surface 73*a* on the opposite side (in FIG. 4, the lower side) of the first force detecting section 11 in the base 73. The motor provided in the base 73 is connected to a reduction gear. An output of the motor is reduced by the reduction gear and transmitted to the base 73.

The finger sections 74 extend generally along the third rotation axis J3 from the supporting surface 73*a* of the base 73. The plurality of finger sections 74 are provided along the circumferential direction around the third rotation axis J3. As shown in FIG. 2, the plurality of finger sections 74 are disposed at the four corners of the base 73 in an initial state. The finger sections 74 are capable of rotating in a direction orthogonal to the third rotation axis J3. In this embodiment, the finger sections 74 are capable of moving along the sides of the base 73. For example, in FIG. 4, the finger sections 74 are capable of moving along the left-right direction (the X-axis direction).

The palm section 75 is attached to the base 73 via the shaft section 76. The palm section 75 has, for example, a square pole shape. The palm section 75 is located between the finger sections 74. The shaft section 76 is attached to the base 73 to be capable of moving along a direction in which the third rotation axis J3 extends. The shaft section 76 has, for example, a columnar shape centering on the third rotation axis J3. The palm section 75 is fixed to the end portion of the shaft section 76 on the opposite side of the base 73. Consequently, the palm section 75 is capable of moving along the direction in which the third rotation axis J3 extends.

The first hand 71 is communicably connected to the robot control device 25 by a cable. Consequently, the first hand 71 performs operation based on a control signal acquired from the robot control device 25. Note that wired communication via the cable is performed according to a standard such as Ethernet (registered trademark) or USB (Universal Serial Bus). The first hand 71 may be connected to the robot control device 25 by wireless communication performed according to a communication standard such as Wi-Fi (registered trademark).

The first manipulator M1 includes seven joints and a first image pickup section 21. The seven joints respectively include not-shown actuators. That is, the first arm including the first manipulator M1 is an arm of a seven-axis vertical multi-joint type. Note that the first arm may operate at a degree of freedom of eight axes or more.

The actuators included in the seven joints in the first manipulator M1 are communicably connected to the robot control device 25 respectively by cables. Consequently, the actuators operate the first manipulator M1 on the basis of a control signal acquired from the robot control device 25. Note that wired communication via the cables is performed according to a standard such as Ethernet (registered trademark) or USB. A part or all of the seven actuators in the first manipulator M1 may be connected to the robot control device 25 by wireless communication performed according to a communication standard such as Wi-Fi (registered trademark).

The first image pickup section 21 is, for example, a camera including a CCD (Charge Coupled Device) or a CMOS (Complementary Metal Oxide Semiconductor), which is an image pickup element that converts condensed light into an electric signal. In this example, the first image pickup section 21 is provided in a part of the first manipulator M1. Therefore, the first image pickup section 21 moves according to movement of the first arm. A range in which the first image pickup section 21 can perform image pickup changes according to the movement of the first arm. The first image pickup section 21 may pick up a still image in the range and may pick up a moving image in the range.

The first image pickup section 21 is communicably connected to the robot control device 25 by a cable. Wired communication via the cable is performed according to a standard such as Ethernet (registered trademark) or USB. Note that the first image pickup section 21 may be connected to the robot control device 25 by wireless communication performed according to a communication standard such as Wi-Fi (registered trademark).

The first force detecting section 11 is provided between the first hand 71 and the first manipulator M1. The first force detecting section 11 is, for example, a force sensor. The first force detecting section 11 detects a force or a moment (torque) that acts on the first hand 71 (or a flange for providing the first hand 71 in the first manipulator M1). The first force detecting section 11 outputs first force detection information including a value indicating the magnitude of the detected force or moment as an output value to the robot control device 25 by communication.

The first force information is used for control based on the first force information of the first arm by the robot control device 25. The control based on the first force information is, for example, compliance control such as impedance control. Note that the first force detecting section 11 may be another sensor that detects a value indicating the magnitude of the force or the moment applied to the first hand 71 (or the flange for providing the first hand 71 in the first manipulator M1) such as a torque sensor.

The first force detecting section 11 is communicably connected to the robot control device 25 by a cable. Wired communication via the cable is performed according to a standard such as Ethernet (registered trademark) or USB. Note that the first force detecting section 11 and the robot control device 25 may be connected by wireless communication performed according to a communication standard such as Wi-Fi (registered trademark).

The second arm includes a second hand (a hand) 72, a second manipulator M2, and a second force detecting section 12. Note that, in this embodiment, the second hand 72 is included in the second arm. However, the second arm and the second hand 72 may be separate. In this case, the second arm includes the second manipulator M2 and the second force detecting section 12. The second manipulator M2 includes seven joints and a second image pickup section 22.

The second hand 72, the second manipulator M2, and the second force detecting section 12 are configured the same as the first hand 71, the first manipulator M1, and the first force detecting section 11 except that the arm in which the secondhand 72, the second manipulator M2, and the second force detecting section 12 are provided is different.

The robot 20 includes a third image pickup section 23 and a fourth image pickup section 24. The third image pickup section 23 is, for example, a camera including a CCD or a CMOS, which is an image pickup element that converts condensed light into an electric signal. The third image pickup section 23 is provided in a part where the third image pickup section 23 is capable of performing, in conjunction with the fourth image pickup section 24, stereoscopic image pickup of a range in which the fourth image pickup section 24 is capable of performing image pickup. The third image pickup section 23 is communicably connected to the robot control device 25 by a cable. Wired communication via the cable is performed according to a standard such as Ethernet (registered trademark) or USB. Note that the third image pickup section 23 may be connected to the robot control device 25 by wireless communication performed according to a communication standard such as Wi-Fi (registered trademark). The fourth image pickup section 24 is the same as the third image pickup section 23 except a position where the fourth image pickup section 24 is provided. The fourth image pickup section 24 is provided in a part where the fourth image pickup section 24 is capable of performing, in conjunction with the third image pickup section 23, stereoscopic image pickup of a range in which the third image pickup section 23 is capable of performing image pickup.

In this example, these functional sections included in the robot 20 explained above acquire control signals from the robot control device 25 incorporated in the robot 20. The functional sections perform operations based on the acquired control signals. Note that the robot 20 may be controlled by the robot control device 25 set on the outside instead of incorporating the robot control device 25. The robot 20 does not have to include a part or all of the first image pickup section 21, the second image pickup section 22, the third image pickup section 23, and the fourth image pickup section 24.

An example of the operation of the robot 20 is explained. In this embodiment, the robot 20 is capable of rotating the first pulley 32 using the first hand 71. As shown in FIG. 4, the robot 20 moves the first hand 71 to immediately above the grip section 33. As shown in FIG. 5, the robot 20 brings the first hand 71 close to the grip section 33 from the upper side. The robot 20 moves the palm section 75 to the lower side with respect to the base 73 and brings the lower surface of the palm section 75 into contact with the upper surface of the grip section 33.

After the grip section 33 is located between the finger sections 74, the robot 20 moves the finger sections 74 in the left-right direction (the X-axis direction) and grips the grip section 33. At this point, the plurality of finger sections 74 respectively move in directions in which the finger sections 74 approach the grip section 33. When the robot 20 grips the grip section 33 with the finger sections 74, the palm section 75 is in contact with the grip section 33.

After gripping the grip section 33 with the first hand 71, the robot 20 rotates the base 73 around the third rotation axis J3 (the ±θ3 direction). Consequently, the grip section 33 rotates around the first rotation axis J1 (the ±θ1 direction) and the first pulley 32 rotates around the first rotation axis J1. In this way, the robot 20 grips the grip section 33 with the finger sections 74 to rotate the first pulley 32. Since the first pulley 32 rotates, the second pulley rotates around the second rotation axis J2 (the ±θ2 direction) via the belt 50. Since the second pulley 42 rotates, the workbench 43 rotates. By highly accurately rotating the first pulley 32 with the first hand 71 as explained above, the robot 20 can highly accurately rotate the workbench 43.

Since the workbench 43 is rotated, it is possible to change the direction of the target object P set on the workbench 43. During work performed on the target object P, the robot 20 appropriately performs the operation for rotating the workbench 43. Consequently, it is possible to make the work by the robot 20 efficient.

The operation of the robot 20 for rotating the first pulley 32 is controlled by the robot control device 25. In other words, the robot control device 25 controls the first hand 71 to grip the grip section 33 with the finger sections 74 to rotate the first pulley 32.

Note that, in the above explanation, the example is explained in which the grip section 33 is gripped and rotated by the first hand 71. However, the robot 20 can also grip and rotate the grip section 33 using the second hand 72.

Figure 6:
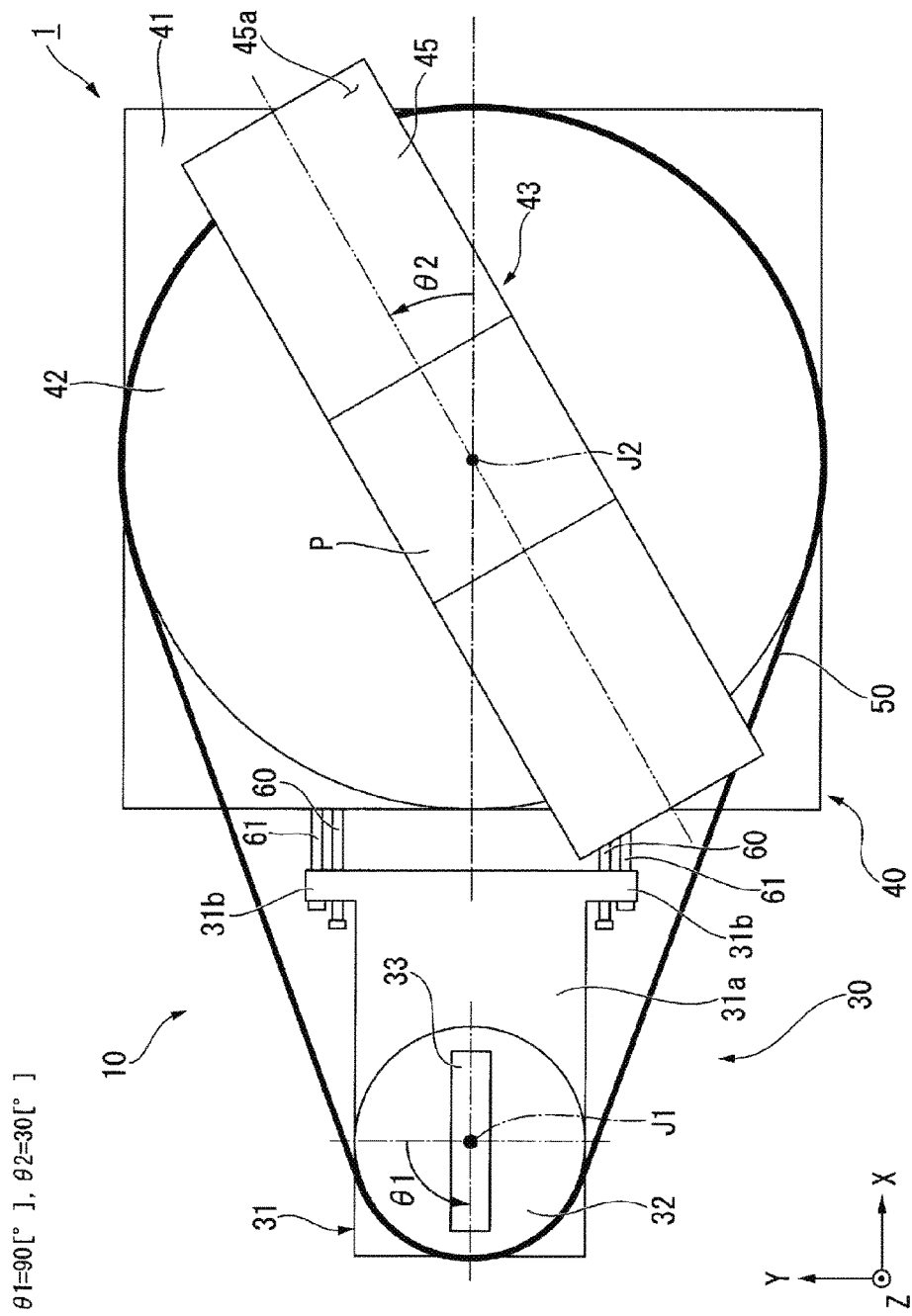
FIG. 6 is a plan view showing the work device in the embodiment.
Figure 7:
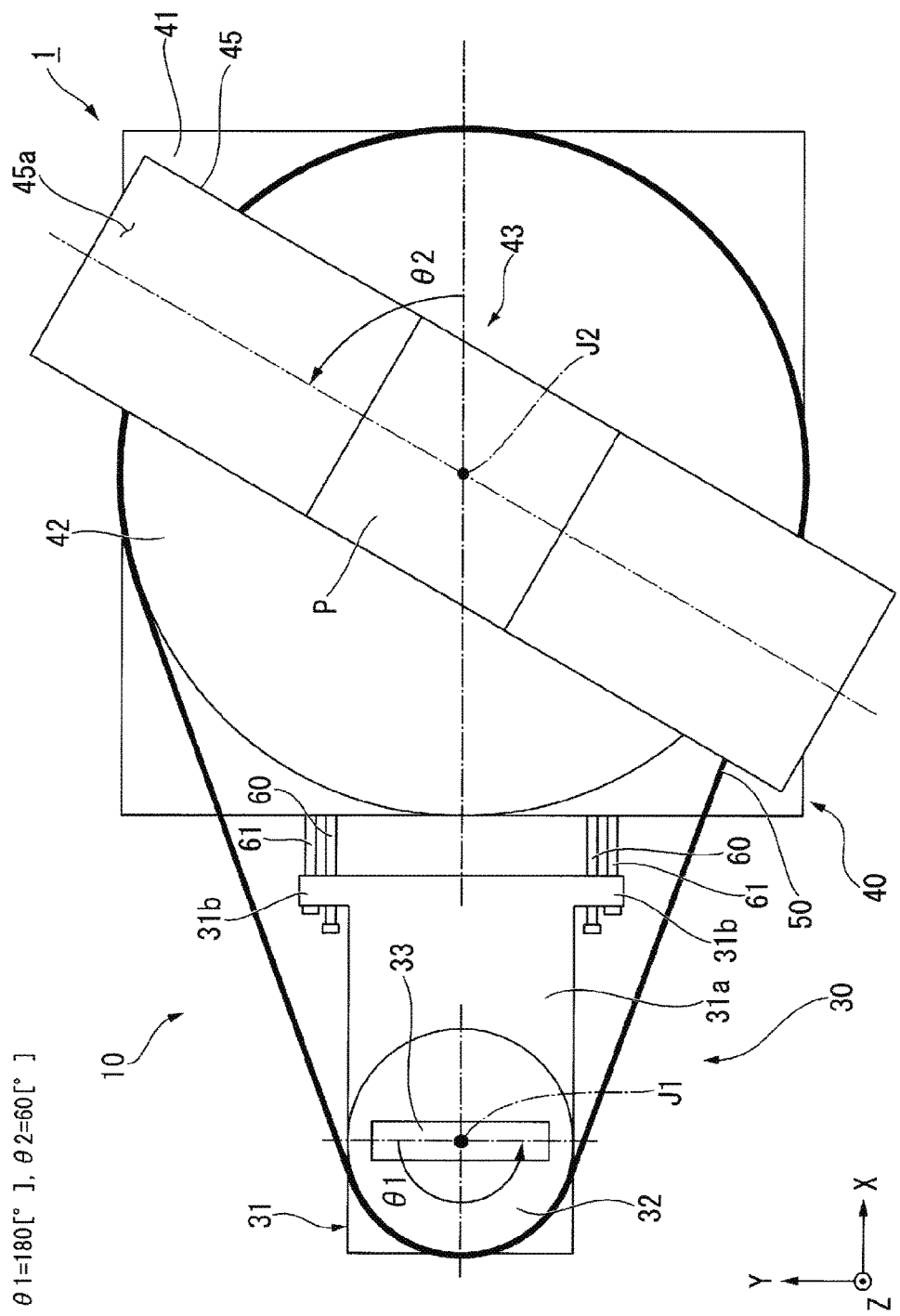
FIG. 7 is a plan view showing the work device in the embodiment.
Figure 8:
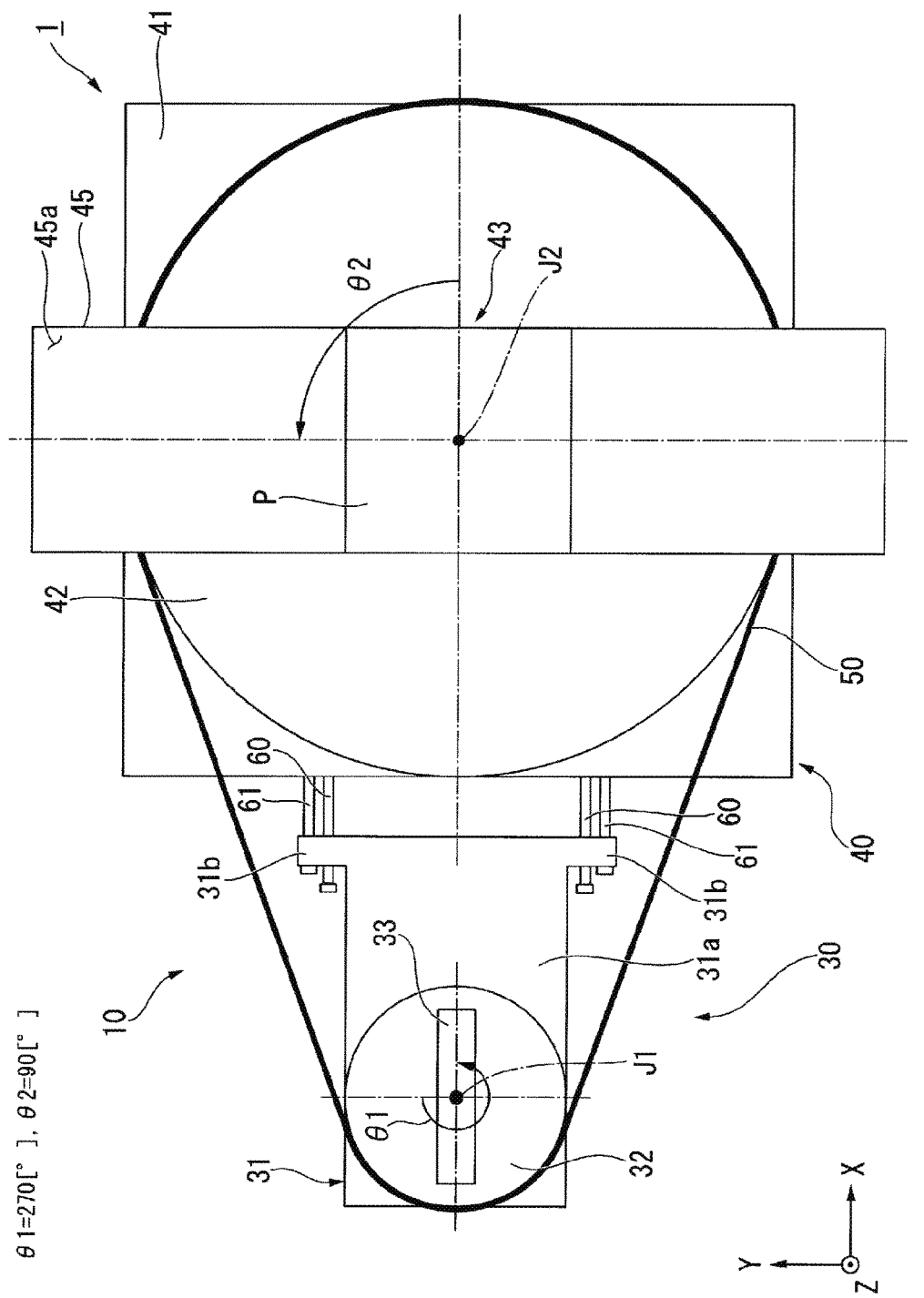
FIG. 8 is a plan view showing the work device in the embodiment.

An example in which the first pulley 32 is rotated is explained with reference to FIGS. 3 and 6 to 8. FIGS. 6 to 8 are plan views showing the work device 10. For example, a state shown in FIG. 3 is set as an initial state in which a rotation angle θ1 of the first pulley 32 (the grip section 33) is 0° and a rotation angle θ2 of the second pulley 42 (the workbench 43) is 0°.

In this embodiment, the ratio of the diameter D1 of the first pulley 32 and the diameter D2 of the second pulley 42 is 1:3. Therefore, when the first pulley 32 rotates, the second pulley 42 rotates by one third of the rotation angle θ1 of the first pulley 32. Specifically, as shown in FIG. 6, when the first pulley 32 is rotated 90°, the second pulley 42 rotates 30°. As shown in FIG. 7, when the first pulley 32 is rotated 180°, the second pulley 42 rotates 60°. As shown in FIG. 8, when the first pulley 32 is rotated 270°, the second pulley 42 rotates 90°. Although not shown in the figure, similarly, when the first pulley 32 is rotated 540°, the second pulley 42 rotates 180°. Consequently, it is possible to reverse the direction of the workbench 43 by 180°.

According to this embodiment, since the robot 20 grips the grip section 33 with the first hand 71 to rotate the first pulley 32, it is possible to rotate the second pulley 42 on which the workbench 43 is provided. Therefore, it is unnecessary to provide, other than the robot control device 25, a motor that rotates the workbench 43 and a control system that controls the motor. Consequently, it is possible to suppress manufacturing cost of the robot system 1 from increasing. Since the workbench 43 can be rotated by controlling the operation of the robot 20 with the robot control device 25, it is unnecessary to separately synchronize the control for rotating the workbench 43 and the control of the robot 20. It is possible to suppress the control of the robot system 1 from being complicated. Therefore, it is possible to obtain the robot system 1 that can highly accurately rotate the workbench 43 on which the target object P of the work performed by the robot 20 is set and can suppress an increase in manufacturing cost and complication of the control.

According to this embodiment, since the workbench 43 can be rotated by the first hand 71, it is possible to rotate the workbench 43 with the high rotation accuracy of the first handle 71 (the base 73). Consequently, it is possible to accurately determine a rotating position of the workbench 43. In this embodiment, the highly accurate encoder is provided in the motor that rotates the base 73. A reduction gear is provided in the output shaft of the motor. Therefore, it is possible to improve accuracy of the rotating position of the base 73. As a result, it is possible to further improve the accuracy of the rotating position of the workbench 43.

According to this embodiment, the rotation of the first pulley 32 is transmitted to the second pulley 42 by the belt 50 wound on the first pulley 32 and the second pulley 42. Therefore, it is possible to dispose the first pulley 32 and the second pulley 42 apart from each other. Consequently, it is possible to dispose the operation section 30 and the work section 40 apart from each other. When the robot 20 performs operation in one of the operation section 30 and the work section 40, it is possible to suppress the other of the operation section 30 and the work section 40 from interfering with the operation. Therefore, it is possible to facilitate the work of the robot 20 in both of the operation section 30 and the work section 40. Further, it is possible to simplify the configuration for transmitting the rotation of the first pulley 32 to the second pulley 42. Therefore, it is possible to reduce manufacturing cost of the work device 10.

According to this embodiment, the adjusting mechanisms 60 capable of adjusting the distance L between the first supporting table 31 and the second supporting table 41 are provided. Therefore, it is possible to adjust, with the adjusting mechanisms 60, the distance between the first pulley 32 supported by the first supporting table 31 and the second pulley 42 supported by the second supporting table 41. Consequently, it is possible to adjust tension applied to the belt 50. Therefore, when the first pulley 32, the second pulley 42, the belt 50, and the like are replaced, it is possible to appropriately adjust the tension of the belt 50 and suitably transmit the rotation of the first pulley 32 to the second pulley 42.

According to this embodiment, the diameter D1 of the first pulley 32 is smaller than the diameter D2 of the second pulley 42. Therefore, when the first pulley 32 is rotated, the rotation angle θ2 of the second pulley 42 is smaller than the rotation angle θ1 of the first pulley 32. Consequently, when the first pulley 32 is rotated by the robot 20, even when an error occurs with respect to the rotation angle θ1 set as a target, it is possible to reduce the error in the second pulley 42 to be smaller than the error in the first pulley 32. That is, it is possible to improve rotation accuracy of the second pulley 42. Therefore, it is possible to improve rotating position accuracy of the workbench 43. Since the first pulley 32 can be reduced in size, it is possible to reduce the weight of the first pulley 32. Consequently, it is possible to reduce force necessary when the first pulley 32 is rotated by the robot 20. Therefore, it is easy to reduce an output of the motor that rotates the base 73 of the first hand 71. It is possible to suppress the first hand 71 from being increased in size.

According to this embodiment, the first hand 71 includes the palm section 75. When the robot 20 grips the grip section 33 with the finger sections 74, the palm section 75 is in contact with the grip section 33. Therefore, it is possible to stably grip the grip section 33 with the first hand 71.

According to this embodiment, the palm section 75 is capable of moving along the direction in which the third rotation axis J3 extends. Therefore, before gripping the grip section 33, the robot 20 can move the palm section 75 to bring the palm section 75 and the grip section 33 into contact with each other and more accurately grasp the position of the grip section 33. Consequently, the robot 20 can easily grip the grip section 33 with the finger sections 74 and more stably grip the grip section 33.

According to this embodiment, the grip section 33 has the rectangular parallelepiped shape. Therefore, it is easy to grip the grip section 33 with the first hand 71.

According to this embodiment, the first pulley 32 is made of resin. Therefore, it is possible to further reduce the weight of the first pulley 32. Consequently, it is possible to further reduce the force necessary when the first pulley 32 is rotated by with the robot 20. Therefore, it is easy to reduce an output of the motor that rotates the base 73 of the first hand 71. It is possible to suppress the first hand 71 from being increased in size.

Note that the invention is not limited to the embodiment explained above. It is possible to adopt other configurations. In the following explanation, concerning components same as the components in the above explanation, explanation is sometimes omitted by, for example, denoting the components with the same reference numerals and signs as appropriate.

In the above explanation, the first pulley 32 and the second pulley 42 are described as the first rotating body and the second rotating body. However, the invention is not limited to this. The first rotating body and the second rotating body are not particularly limited as long as the second rotating body rotates in association with the rotation of the first rotating body. The first rotating body and the second rotating body may be gears that mesh with each other or may be friction wheels that are in contact with each other. In this case, the belt 50 is not provided.

In the above explanation, the belt 50 is described as the annular driving member. However, the invention is not limited to this. The annular driving member is not particularly limited as long as the annular driving member can transmit the rotation of the first pulley 32 to the second pulley 42. The annular driving member may be a chain. In this case, the first rotating body and the second rotating body are sprockets.

In the above explanation, the first rotation axis J1 and the second rotation axis J2 are parallel. However, the invention is not limited to this. The first rotation axis J1 and the second rotation axis J2 may cross. In this case, the first rotating body and the second rotating body may be, for example, bevel gears that mesh with each other.

In the above explanation, the workbench 43 is described as the setting section. However, the invention is not limited to this. The setting section is not particularly limited as long as the target object P can be set on the setting section. The setting section may be at least a part of the upper surface of the second pulley 42. In this case, the target object P is directly set on the upper surface of the second pulley 42.

The shape of the first supporting table 31 and the shape of the second supporting table 41 are not particularly limited. The first supporting table 31 and the second supporting table 41 do not have to be provided. The adjusting mechanisms 60 are not particularly limited as long as the adjusting mechanisms 60 can adjust the distance L between the first supporting table 31 and the second supporting table 41.

The ratio of the diameter D1 of the first pulley 32 and the diameter D2 of the second pulley 42 is not particularly limited. The diameter D1 of the first pulley 32 may be larger than the diameter D2 of the second pulley 42. The diameter D1 of the first pulley 32 may be the same as the diameter D2 of the second pulley 42.

The position of the palm section 75 with respect to the base 73 may be fixed. The first hand 71 does not have to include the palm section 75. The grip section 33 is not particularly limited as long as the grip section 33 can be gripped by the first hand 71.

The material of the first pulley 32 and the second pulley 42 is not particularly limited. The material of the first pulley 32 and the second pulley 42 may be metal.

The robot 20 only has to include at least one hand. That is, one of the first hand 71 and the second hand 72 may be an end effector other than a hand.

In the above explanation, the base 73 rotates around the third rotation axis J3 (the ±θ3 direction). However, the invention is not limited to this. The configuration of the robot 20 is not particularly limited as long as the robot can rotate the gripped grip section 33 around the first rotation axis J1 (the ±θ direction). For example, the robot 20 may have a configuration in which a rotating mechanism is provided in a portion other than the first hand 71 in the first arm and the grip section 33 (the first pulley 32) is rotated by the rotating mechanism.

The work performed by the robot 20 in the work device 10 is not particularly limited. The work performed by the robot 20 may be assembly of an object other than the box or may be machining such as cutting or welding of a target object.

Note that the configurations explained above can be combined as appropriate in a range in which the configurations are not contradictory to each other.

The entire disclosure of Japanese Patent Application No. 2015-235083, filed Dec. 1, 2015 is expressly incorporated by reference herein.

What is claimed is:

1. A robot system comprising:
    a robot including a hand including a plurality of finger sections; and
    a work device in which the robot performs work, wherein the work device includes:
        a first rotating body;
        a second rotating body configured to rotate in association with rotation of the first rotating body;
        a grip section provided in the first rotating body; and
        a setting section provided in the second rotating body, a target object of the work performed by the robot being set on the setting section, and
    the robot grips the grip section with the finger sections to rotate the first rotating body.

2. The robot system according to claim 1, wherein the work device includes an annular driving member wound on the first rotating body and the second rotating body, and
    the rotation of the first rotating body is transmitted to the second rotating body via the driving member.

3. The robot system according to claim 2, wherein the work device further includes:
    a first supporting table configured to rotatably support the first rotating body;
    a second supporting table configured to rotatably support the second rotating body and coupled to the first supporting table; and
    an adjusting mechanism capable of adjusting a distance between the first supporting table and the second supporting table.

4. The robot system according to claim 1, wherein a diameter of the first rotating body is smaller than a diameter of the second rotating body.

5. The robot system according to claim 1, wherein the hand further includes:
    a base configured to support the plurality of finger sections; and
    a palm section attached to the base and located between the finger sections, and
    the palm section comes into contact with the grip section when the robot grips the grip section with the finger sections.

6. The robot system according to claim 5, wherein the base is capable of rotating around a predetermined axis, the plurality of finger sections are provided around the predetermined axis along a circumferential direction, and the palm section is capable of moving along a direction in which the predetermined axis extends.

7. The robot system according to claim 1, wherein the grip section has a rectangular parallelepiped shape.

8. The robot system according to claim 1, wherein the first rotating body is made of resin.

* * * * *